(12) United States Patent
Knoblauch et al.

(10) Patent No.: US 11,563,352 B2
(45) Date of Patent: Jan. 24, 2023

(54) ELECTRIC MACHINE WITH A HOUSING A STATOR AND SEALS ON HOUSING PROTRUSIONS

(71) Applicant: Dr. Ing. h.c. F. Porsche Aktiengesellschaft, Stuttgart (DE)

(72) Inventors: Daniel Knoblauch, Leonberg (DE); Stefan Oechslen, Stuttgart (DE)

(73) Assignee: Dr. Ing. h.c. F. Porsche AG, Stuttgart (DE)

(*) Notice: Subject to any disclaimer, the term of this patent is extended or adjusted under 35 U.S.C. 154(b) by 0 days.

(21) Appl. No.: 17/363,361

(22) Filed: Jun. 30, 2021

(65) Prior Publication Data
US 2022/0052576 A1     Feb. 17, 2022

(30) Foreign Application Priority Data

Aug. 14, 2020   (DE) ...................... 10 2020 121 421.9

(51) Int. Cl.
*H02K 5/10*     (2006.01)
*H02K 5/128*    (2006.01)

(52) U.S. Cl.
CPC ............... *H02K 5/10* (2013.01); *H02K 5/128* (2013.01); *H02K 2201/03* (2013.01)

(58) Field of Classification Search
CPC ....... H02K 5/10; H02K 5/128; H02K 2201/03
USPC ......................................... 310/89, 88, 87, 85
See application file for complete search history.

(56) References Cited

U.S. PATENT DOCUMENTS

| | | | | |
|---|---|---|---|---|
| 2,762,311 | A * | 9/1956 | Litzenberg | F04D 13/0633 417/357 |
| 2,796,835 | A * | 6/1957 | White | F04D 13/0633 310/90 |
| 3,873,861 | A * | 3/1975 | Halm | H02K 1/185 310/410 |
| 4,992,686 | A * | 2/1991 | Heine | H02K 5/225 310/67 R |
| 2014/0139061 | A1* | 5/2014 | Gutjahr | H02K 9/197 310/86 |
| 2014/0252893 | A1* | 9/2014 | Veeh | H02K 1/32 310/58 |

(Continued)

FOREIGN PATENT DOCUMENTS

DE       101 37 885       2/2003
DE    10 2008 014 379     9/2009

(Continued)

OTHER PUBLICATIONS

German Search Report dated Apr. 12, 2021.

*Primary Examiner* — Maged M Almawri
(74) *Attorney, Agent, or Firm* — Gerald E. Hespos; Michael J. Porco

(57) ABSTRACT

An electric machine (1) has a housing (2) in which a stator (3) and a rotatable rotor (4) are arranged. The stator (3) is of hollow-cylindrical design and is arranged in a stator chamber (5) of the housing (2). The rotor (4) is arranged radially inside the stator (3) in a rotor chamber (8). An air gap (9) is provided between the rotor (4) and the stator (3) to permit rotation of the rotor (4) relative to the stator (3). The stator chamber (5) is delimited radially on the inside by a cylindrical wall (10) that is sealed with respect to the housing (2) by at least one sealing element (12). The housing (2) has at least one axially projecting protrusion (13) that forms an axial end face (17) and a radially outwardly facing circumferential shoulder (18) that supports the sealing element (12).

9 Claims, 3 Drawing Sheets

(56) References Cited

U.S. PATENT DOCUMENTS

| | | | | |
|---|---|---|---|---|
| 2017/0244296 | A1* | 8/2017 | Takeuchi | ............... H02K 5/10 |
| 2019/0334405 | A1* | 10/2019 | Yamasaki | ............. H02K 15/12 |
| 2021/0003132 | A1* | 1/2021 | Imai | ................... F04D 29/086 |

FOREIGN PATENT DOCUMENTS

| | | |
|---|---|---|
| DE | 20 2011 103 647 | 12/2012 |
| EP | 1 271 747 | 1/2003 |
| GB | 675 602 | 7/1952 |

* cited by examiner

ELECTRIC MACHINE WITH A HOUSING A STATOR AND SEALS ON HOUSING PROTRUSIONS

CROSS REFERENCE TO RELATED APPLICATION

This application claims priority under 35 USC 119 to German Patent Appl. No. 10 2020 121 421.9 filed on Aug. 14, 2020, the entire disclosure of which is incorporated herein by reference.

BACKGROUND

Field of the Invention

The invention relates to an electric machine, in particular for the drive train of a motor vehicle.

Related Art

Electric machines typically have a stator and a rotor in a housing. The stator can be a hollow cylinder with a stator winding in a stator chamber. The rotor can be arranged in the cylindrical opening of the stator in a rotor chamber. Between the rotor and the stator there is typically an air gap to permit rotation of the rotor. According to the prior art, a can is arranged between the stator and the rotor to close off the stator chamber. A cooling fluid may be required to flow through the stator chamber during operation. In this case, the can must be sealed axially with respect to the housing to ensure that the cooling fluid does not get into the region of the rotor.

A known practice is to provide annular grooves that open radially outward in the housing. Sealing rings are arranged in the grooves and rest against the can to provide sealing radially on the outside. A disclosure in this regard can be found in DE 10 2008 014 379 A1, US 2014/0252893 A1, EP 1 271 747 A1 and DE 20 2011 103 647 U1. The sealing rings must be deformed radially in an elastic manner to enable the sealing rings to be placed in the grooves. This can lead to the sealing ring being damaged or installed incorrectly, thereby jeopardizing the sealing ability of the seal.

It is the object of the invention to provide an electric machine having sealing that is less at risk of being compromised during installation.

SUMMARY

One embodiment of the invention relates to an electric machine having a housing, in which a stator and a rotatable rotor are arranged. The stator is a hollow cylinder and is arranged in a stator chamber of the housing. The rotor is arranged in a rotor chamber in the cylindrical opening of the stator. An air gap is provided between the rotor and the stator to permit rotation of the rotor relative to the stator. The stator chamber is delimited radially on the inside by a cylindrical wall that is sealed with respect to the housing by at least one sealing element. The housing has at least one axially projecting protrusion that forms an axial end face and a radially outwardly facing circumferential shoulder to support the sealing element. Thus, the seal can be mounted without radial expansion and elongation, thereby ensuring durability of the sealing element in the long term and excluding damage to the seal by expansion during installation.

In one embodiment, the housing has two axially projecting protrusions, each of which has an axial end face and a radially outwardly facing circumferential shoulder for supporting a sealing element. Thus, the cylindrical wall that is designed as a can is capable of being sealed on both sides in its axial end regions.

The two protrusions may lie opposite one another to ensure reliable sealing of the cylindrical wall in its opposite axial end regions.

At least one of the protrusions or both protrusions may be attached to a housing cover or each may be attached to a respective housing cover. In this way, simple production and assembly is achieved because the housing cover can be produced separately and, for example, connected to a remainder of the housing. Thus, installation of the sealing ring is made easier.

The sealing element may be a sealing ring supported circumferentially by the circumferential shoulder of the axially projecting protrusion to achieve circumferential sealing of the cylindrical wall.

At least one holding element or plural holding elements may be provided and may be arranged on the axial end face of the protrusion. The holding element keeps the sealing element in its location of installation throughout its service life so that the sealing ring can perform the sealing function on a permanent basis.

The at least one holding element or the holding elements may project radially beyond the circumferential shoulder. In this way, the possibility of the sealing element moving spontaneously away from its location of installation is avoided.

The holding element may be a ring. Thus, installation of one component for each sealing element is all that is required to secure the position, making installation easier. Moreover, an advantageous circumferential positioning is secured.

The holding element or the holding elements may be fastened on the respective protrusion, on the housing and/or on the housing cover. The holding element may be held by positive engagement to achieve centering, in addition to being fastened.

The sealing element may be supported by a supporting element and may be arranged with the supporting element on the circumferential shoulder of the axially projecting protrusion. Reliable and correctly positioned arrangement can thereby be achieved, and damage during installation can be avoided.

The invention is explained in detail below by means of an exemplary embodiment with reference to the drawing.

DETAILED DESCRIPTION

Figure 1:
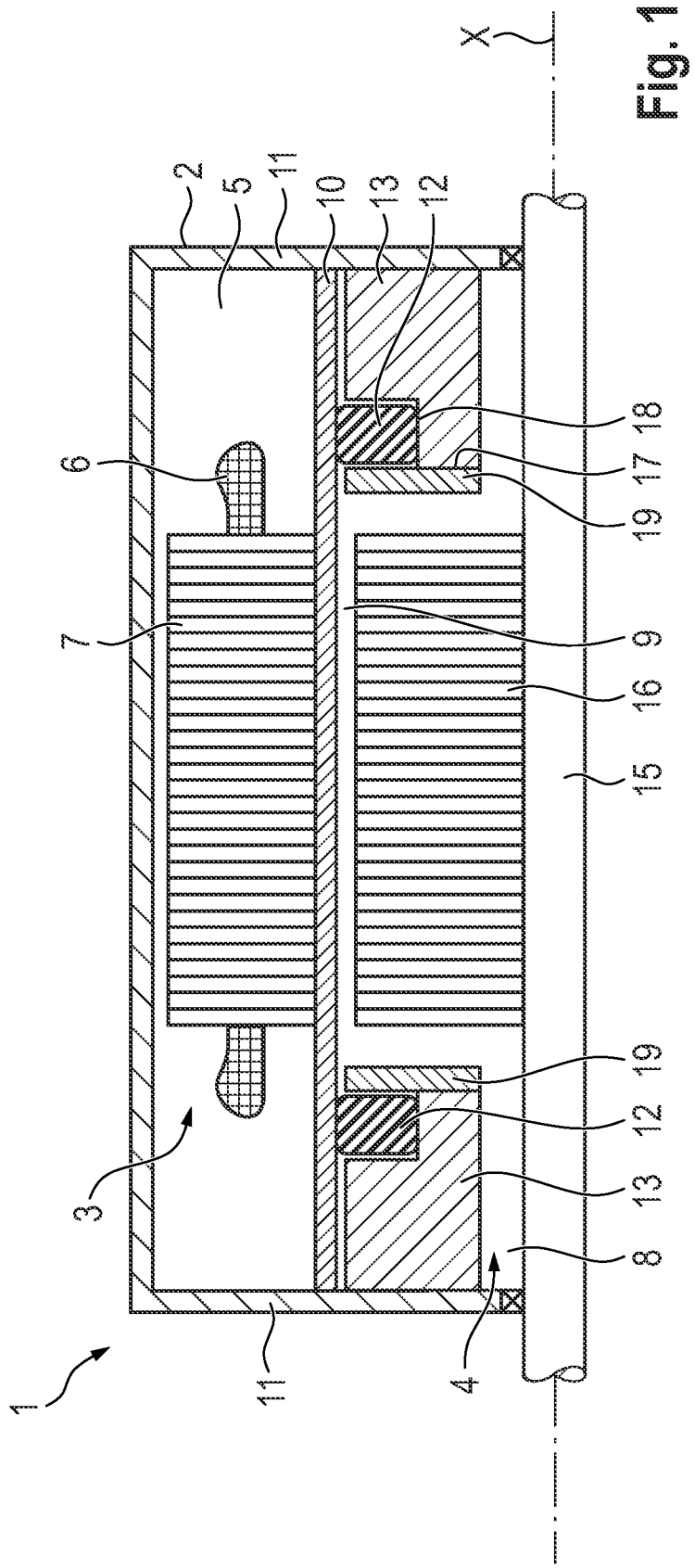
FIG. 1 is a schematic partially sectioned view of a first embodiment of an electric machine.

FIG. 1 is a partially sectioned view of a first embodiment of an electric machine 1 of the kind that can be used as a driving machine for a motor vehicle, for example. In this context, the motor vehicle can be an electric vehicle or a hybrid vehicle and can be driven by this electric machine 1 alone or, alternatively, only partially with the additional use of some other drive motor.

The electric machine 1 has a housing 2 that is indicated only schematically. A stator 3 and a rotatable rotor 4 are arranged in the housing 2. The rotor 4 is rotatable relative about the axis X-X. The rotor 4 has a rotor shaft 15 and rotor laminations 16.

The stator 3 is a hollow cylinder and is arranged in a stator chamber 5. The stator 3 has stator windings 6 and optionally stator laminations 7. The stator chamber 5 is delimited radially on the inside by a cylindrical wall 10 that can be designed as a can.

The rotor 4 is arranged in the cylindrical opening of the stator 3 in a rotor chamber 8. Thus, the rotor 4 is arranged radially inside the stator 3.

An air gap 9 is provided between the rotor 4 and the stator 3 so that the rotor 4 can rotate.

A sealing element 12 seals the cylindrical wall 10 of the stator chamber 5 with respect to the housing 2 and, in particular, with respect to at least one housing cover 11 or with respect to both housing covers 11 that close the housing 2. As a result, the stator chamber 5 is closed in a sealed manner and allows fluid to flow through to cool the stator 3 without some of the fluid getting into the rotor chamber 8, which would cause frictional losses in the air gap 9.

The sealing element 12 is a flexible ring, e.g. an elastomer ring or a rubber ring. It is advantageous if two such sealing elements 12 are provided in the respective end regions of the cylindrical wall.

The housing 2 has at least one axially projecting protrusion 13 to receive the sealing element. In this arrangement, each protrusion 13 supports a sealing element 12.

Each axially projecting protrusion 13 has an axial end face 17 and a radially outwardly facing circumferential shoulder 18 that supports the sealing element 12.

Figure 2:
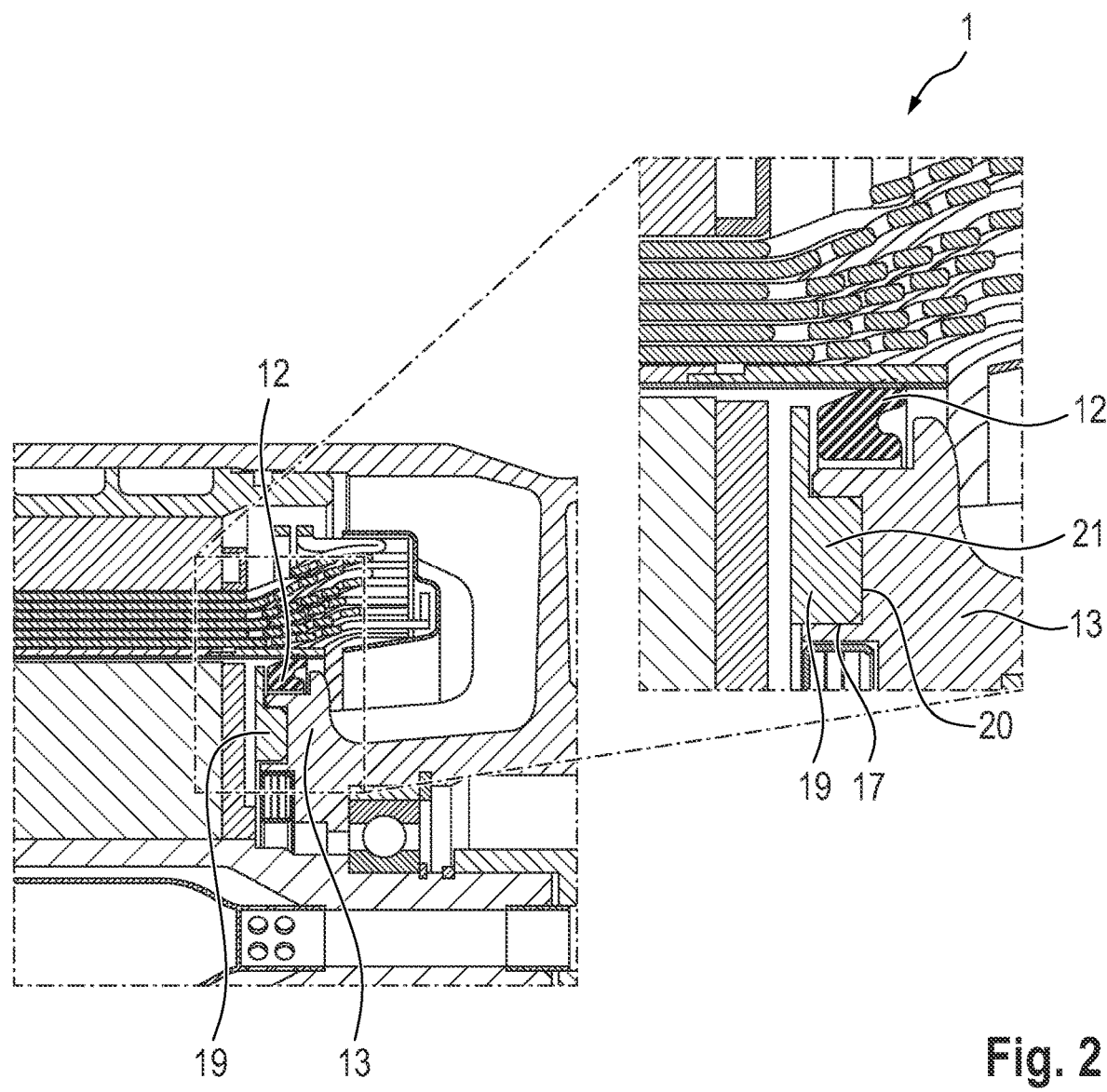
FIG. 2 is a schematic partially sectioned view of a second embodiment of an electric machine with an enlarged detail.

According to FIG. 2, the housing 2 has two axially projecting protrusions 13, each of which has an axial end face 17 and a radially outwardly facing circumferential shoulder 18 to support a sealing element 12.

It can also be seen from FIG. 2 that the two protrusions 13 lie opposite one another since they are optionally arranged on the respective axial ends of the housing 2, e.g. on housing covers 11. Thus, one of the protrusions 13 can be attached to a housing cover 11, or both protrusions 13 can be attached to a respective housing cover 11.

The sealing element 12 is a sealing ring supported circumferentially by the circumferential shoulder 18 of the axially projecting protrusion 17. This makes the sealing element 12 easy to install without having to stretch the sealing element 12 too much.

One or more holding elements 19 are provided on the axial end face 17 of the protrusion 13 to hold the sealing element 12 on the circumferential shoulder. It is particularly advantageous in this context if the at least one holding element 19 or the holding elements 19 projects or project radially beyond the circumferential shoulder 18 to secure the sealing element in position on the circumferential shoulder 18.

The holding element 19 may be a ring or ring segments arranged in contact with one another or spaced apart in the circumferential direction.

The holding element 19 or the holding elements 19 may be fastened on the respective protrusion 13, on the housing 2 and/or on the housing cover 11. This can be accomplished by screwing, adhesive bonding, welding, riveting, insertion, by means of a bayonet joint, by means of latching joint and/or by means of a positive joint.

FIG. 2 shows that the respective protrusion 13 has at least one recess 20 or plural recesses 20. The recess 20 or the recesses are provided on the axial end face 17. A protrusion 21 or protrusions 21 engages or engage in this recess or in the recesses 20 to secure the holding element 19 in position and optionally also fasten it on the protrusion 13. FIG. 2 thus shows an embodiment in which the construction is similar to the embodiment in FIG. 1, and therefore attention is drawn to the description of FIG. 1.

Figure 3:
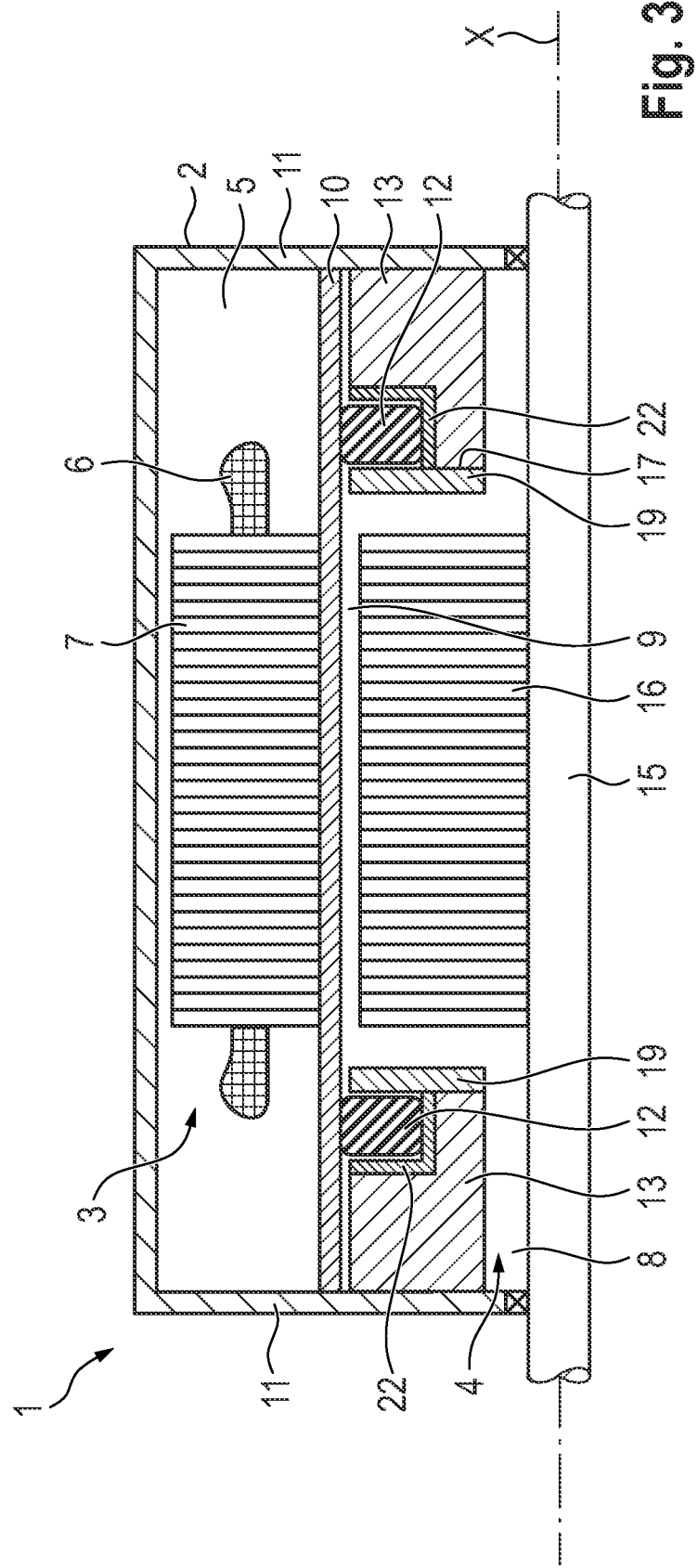
FIG. 3 is a schematic partially sectioned view of a third embodiment of an electric machine.

FIG. 3 shows an embodiment in which the construction is fundamentally similar in design to FIG. 1, wherein the sealing element 12 is supported by a supporting element 22. In other respects, attention is drawn to the description of FIG. 1.

The sealing element 12 is arranged on the supporting element 22 and is arranged with the supporting element 22 on the circumferential shoulder 18 of the axially projecting protrusion 13. The supporting element 22 is of circumferential design or consists of ring segments that rest circumferentially against one another. In section, the supporting element 22 is L-shaped to make the installation of the sealing element 12 easier.

To avoid eddy currents and hence additional losses and temperature developments in the regions considered, it is advantageous if the holding element or elements (19) and/or supporting elements (22) is/are composed of an electrically nonconductive material, e.g. plastic or, particularly advantageously, of a fiber-reinforced plastic.

What is claimed is:

1. An electric machine comprising:
   a housing;
   a stator and a rotatable rotor arranged in the housing, the stator being a hollow cylinder and being arranged in a stator chamber of the housing, the rotor being arranged in a rotor chamber radially inward of the stator chamber, a cylindrical wall being between the stator chamber and the rotor, and an air gap being provided between the rotor and the cylindrical wall, the air gap permitting rotation of the rotor relative to the stator, opposite first and second housing covers closing opposite first and second axial ends of the rotor chamber and the stator chamber;
   first and second protrusions projecting axially toward one another from the opposite respective first and second housing covers and into the rotor chamber, each of the protrusions having a radially aligned end face facing away from the respective housing cover, a radially aligned recessed end face and an axially extending radially outwardly facing circumferential shoulder extending between the end face and the recessed end face;
   first and second sealing elements mounted respectively on the first and second protrusions, each of the sealing elements having an inner circumferential surface supported on the outwardly facing circumferential shoulder of the respective protrusion and an axial end opposed to and facing the recessed end face of the respective protrusion; and
   first and second radially aligned holding elements mounted to the end faces of the respective first and second protrusions, the radially aligned holding element oppose and face a radially aligned surface of the respective sealing elements.

2. The electric machine of claim 1, wherein the first and second protrusions lie opposite one another.

3. The electric machine of claim 1, wherein at least one of the protrusions is attached to a housing cover.

4. The electric machine of claim 1, wherein the first and second sealing elements are sealing rings supported circumferentially by the circumferential shoulders of the respective first and second protrusions.

5. The electric machine of claim 1, wherein each of the first and second holding elements projects radially inward beyond the circumferential shoulder.

6. The electric machine of claim 1, wherein the holding element is a ring.

7. The electric machine of claim 1, wherein the at least one holding element is fastened on the respective protrusion on the housing and/or on the housing cover.

8. The electric machine of claim 1, wherein the sealing element is supported by a supporting element and is arranged with the supporting element on the circumferential shoulder of the respective protrusion.

9. The electric machine of claim 1, wherein each of the first and second protrusions has two axially aligned projections that are spaced radially from one another, and wherein each of the first and second radially aligned holding elements has an axial projection engaged between the radially spaced axially aligned projections of the respective protrusion.

\* \* \* \* \*